US012776639B2

(12) United States Patent
Fares et al.

(10) Patent No.: US 12,776,639 B2
(45) Date of Patent: Oct. 27, 2026

(54) CIRCUIT BREAKER PROTECTION FROM DELAYED ZERO-CROSSING

(71) Applicant: Saudi Arabian Oil Company, Dhahran (SA)

(72) Inventors: Nabil El Halabi Fares, Dhahran (SA); Ibrahim Mohammed Aljudaibi, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 639 days.

(21) Appl. No.: 18/187,028

(22) Filed: Mar. 21, 2023

(65) Prior Publication Data

US 2024/0322551 A1 Sep. 26, 2024

(51) Int. Cl.
*H02H 1/00* (2006.01)
*H02H 7/22* (2006.01)

(52) U.S. Cl.
CPC .......... *H02H 1/0092* (2013.01); *H02H 7/222* (2013.01)

(58) Field of Classification Search
CPC ........ H02H 1/0092; H02H 7/222; H02H 1/00; H02H 7/22
USPC ...................................................... 361/63–69
See application file for complete search history.

(56) References Cited

U.S. PATENT DOCUMENTS

| | | | | |
|---|---|---|---|---|
| 9,160,158 | B2 | 10/2015 | Schweitzer, III et al. | |
| 10,243,351 | B2 | 3/2019 | Brncic et al. | |
| 10,756,536 | B2 | 8/2020 | Kral et al. | |
| 2015/0380923 | A1* | 12/2015 | Ukil | H02H 3/083 361/93.1 |
| 2021/0231723 | A1* | 7/2021 | Hao | G01R 19/2513 |
| 2022/0399712 | A1* | 12/2022 | Contrael | G06F 30/20 |
| 2023/0102770 | A1* | 3/2023 | Adkins | H01H 50/36 335/185 |
| 2024/0204513 | A1 | 6/2024 | Donolo et al. | |

FOREIGN PATENT DOCUMENTS

| | | | |
|---|---|---|---|
| CN | 201142562 | 10/2008 | |
| CN | 102646968 | 8/2012 | |
| CN | 114121563 A * | 3/2022 | H01H 71/10 |

OTHER PUBLICATIONS

CN 114121563 A Machine Translation (Year: 2022).*
Bak, "EHV/HV Underground Cable Systems for Power Transmission," Department of Energy Technology, Aalborg University, 2015, 40 pages.

(Continued)

*Primary Examiner* — Danny Nguyen
(74) *Attorney, Agent, or Firm* — Dinsmore & Shohl LLP

(57) ABSTRACT

Control of a circuit breaker in a high voltage power station includes a signal processing circuit housed in the circuit breaker local control cabinet and wired in series with the circuit breaker, the signal processing circuit to receive a continuous alternating current (AC) electrical signal; determine an anticipated zero-crossing from the continuous AC electrical signal based on a comparison of an average of an instantaneous value of the AC electrical signal with a corresponding value of a direct current (DC) component of the AC electrical signal; and send, to the circuit breaker, a permissive signal to operate the circuit breaker or a blocking signal to prevent operation of the circuit breaker based on the determination of the anticipated zero-crossing.

21 Claims, 8 Drawing Sheets

(56) References Cited

OTHER PUBLICATIONS

Khalilnezhad et. al., "Countermeasures of Zero-Missing Phenomenon in (E)HV Cable Systems," IEEE Transactions on Power Delivery, Aug. 2018, 33(4):1657-1667, 11 pages.
Zang et al., "Using t e Fault Current Limiter wit Transformer Type Reactor to Reduce S ort Circuit Currents," presented at the IEEE/PES Transmission & Distribution Conference & Exposition: Asia and Pacific, Dalian, China, Aug. 15-18, 2005, 4 pages.

* cited by examiner

CIRCUIT BREAKER PROTECTION FROM DELAYED ZERO-CROSSING

FIELD

This disclosure pertains to protecting a circuit breaker from damage that can occur from an interrupting alternating current with a delayed zero-crossing.

BACKGROUND

High-voltage (HV) power distribution stations, including those found on offshore installations, can include electrical power components. Such components can include shunt reactors and transformers that affect the overall efficiency and operation of the high-voltage power distribution stations. Circuit breakers can be used to disconnect various power components from high-voltage sources in the event of a fault condition.

SUMMARY

The present disclosure describes techniques that can be used for preventing high voltage circuit breaker from opening or tripping under scenarios of current delayed zero-crossing, which can result in catastrophic breaker failure. Aspects of the embodiments include a device, located in the circuit breaker local control cabinet, that utilizes an analytical methodology to detect the current delayed zero-crossing occurrence through digital and/or analogue replica calculation. The device will therefore provide either a permissive (make) or a blocking (break) signal to the tripping circuit of each circuit breaker phase, in case of independent phase operation, or common signal in case of three-phase operation circuit breakers.

Aspects of the embodiments include a method performed by a signal processor, the method including receiving, by the signal processer, a continuous alternating current (AC) electrical signal; determining, by the signal processing circuit, an anticipated zero-crossing from the continuous AC electrical signal based on a comparison of an average of an instantaneous value of the AC electrical signal with a corresponding value of a direct current (DC) component of the AC electrical signal; and sending, to a circuit breaker, a permissive signal to operate the circuit breaker or a blocking signal to prevent operation of the circuit breaker based on the determination of the anticipated zero-crossing.

In some embodiments, determining the anticipated zero-crossing includes determining, by the signal processing circuit, a rate of change of the AC electrical signal; and comparing the rate of change of the AC electrical signal against a threshold value.

In some embodiments, the permissive signal is generated based on the rate of change of the AC electrical signal being greater than the threshold value; and the blocking signal is generated based on the rate of change of the AC electrical signal being less than or equal to the threshold value.

In some embodiments, the threshold value comprises a value of 1.5 times the DC component of the AC electrical signal.

In some embodiments, determining the anticipated zero-crossing includes calculating an average of four consecutive samples of the continuous AC electrical signals over time; and comparing the average of four consecutive samples of the continuous AC electrical signals against a threshold value.

In some embodiments, the permissive signal is generated based on the average of four consecutive samples of the continuous AC electrical signals being greater than the threshold value; and the blocking signal is generated based on the rate of change of the AC electrical signal being less than or equal to the threshold value.

In some embodiments, the threshold value includes a value in the rage of 0.4 to 0.6 times the DC component of the AC electrical signal.

Some embodiments include down-sampling the AC electrical signal and the DC component to eight samples per cycle.

Some embodiments include filtering high frequency from the AC electrical signal and obtaining the fundamental frequency of the AC electrical signal.

Aspects of the embodiments are directed to an apparatus that includes a signal processing circuitry electrically coupled in series to a trip circuit breaker within a circuit breaker local control cabinet, the signal processing circuitry to receive, by the signal processing circuit, a continuous alternating current (AC) electrical signal; determine, by the signal processing circuit, an anticipated zero-crossing from the continuous AC electrical signal based on a comparison of an average of an instantaneous value of the AC electrical signal with a corresponding value of a direct current (DC) component of the AC electrical signal; and send, to the circuit breaker, a permissive signal to operate the circuit breaker or a blocking signal to prevent operation of the circuit breaker based on the determination of the anticipated zero-crossing.

In some embodiments, the signal processing circuitry is to determine the anticipated zero-crossing by determining, by the signal processing circuit, a rate of change of the AC electrical signal; and comparing the rate of change of the AC electrical signal against a threshold value.

In some embodiments, the permissive signal is generated based on the rate of change of the AC electrical signal being greater than the threshold value; and the blocking signal is generated based on the rate of change of the AC electrical signal being less than or equal to the threshold value.

In some embodiments, the threshold value comprises a value of 1.5 times the DC component of the AC electrical signal.

In some embodiments, signal processing circuitry is to determine the anticipated zero-crossing by calculating an average of four consecutive samples of the continuous AC electrical signals over time; and comparing the average of four consecutive samples of the continuous AC electrical signals against a threshold value.

In some embodiments, the permissive signal is generated based on the average of four consecutive samples of the continuous AC electrical signals being greater than the threshold value; and the blocking signal is generated based on the rate of change of the AC electrical signal being less than or equal to the threshold value.

In some embodiments, the threshold value comprises a value in the rage of 0.4 to 0.6 times the DC component of the AC electrical signal.

Some embodiments include down-sampling the AC electrical signal and the DC component to eight samples per cycle.

Some embodiments include filtering high frequency from the AC electrical signal.

Aspects of the embodiments are directed to a system that includes a circuit breaker in a high voltage power station; a circuit breaker local control cabinet; and a signal processing circuit housed in the circuit breaker local control cabinet and wired in series with the circuit breaker, the signal processing circuit to receive, by the signal processing circuit, a continuous alternating current (AC) electrical signal; determine, by the signal processing circuit, an anticipated zero-crossing from the continuous AC electrical signal based on a comparison of an average of an instantaneous value of the AC electrical signal with a corresponding value of a direct current (DC) component of the AC electrical signal; and send, to the circuit breaker, a permissive signal to operate the circuit breaker or a blocking signal to prevent operation of the circuit breaker based on the determination of the anticipated zero-crossing.

In some embodiments, the signal processing circuitry is to determine the anticipated zero-crossing by determining, by the signal processing circuit, a rate of change of the AC electrical signal; and comparing the rate of change of the AC electrical signal against a threshold value. The permissive signal is generated based on the rate of change of the AC electrical signal being greater than the threshold value; and the blocking signal is generated based on the rate of change of the AC electrical signal being less than or equal to the threshold value.

In some embodiments, the signal processing circuitry is to determine the anticipated zero-crossing by calculating an average of four consecutive samples of the continuous AC electrical signals over time; and comparing the average of four consecutive samples of the continuous AC electrical signals against a threshold value. The permissive signal is generated based on the average of four consecutive samples of the continuous AC electrical signals being greater than the threshold value; and The blocking signal is generated based on the rate of change of the AC electrical signal being less than or equal to the threshold value.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

Aspects of the present disclosure result in certain advantages that are apparent to those of skill in the art. Among the advantages are the protection of circuit breakers within the HV power distribution stations, ease of integration of current and voltage analysis equipment into a circuit breaker local control cabinet, and overall cost reductions. Aspects of this disclosure will prevent a HV circuit breaker from opening or tripping under scenarios of current delayed zero-crossing, which can result in catastrophic breaker failure. Moreover, certain features of the embodiments facilitate removal or mitigation of the current practice of project designers and protection engineers from utilizing complex system modeling and customized protection schemes, heavily dependent on data accuracy and human-interference, to prevent the scenario of opening or tripping a circuit breaker under delayed zero-crossing current.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements.

DETAILED DESCRIPTION

The following detailed description describes techniques for preventing high voltage circuit breaker from opening or tripping under scenarios of current delayed zero-crossing, which can result in catastrophic breaker failure. Aspects of the embodiments include a device, located in the circuit breaker local control cabinet, that utilizes an analytical methodology to detect the current delayed zero-crossing occurrence through digital and/or analogue replica calculation. The device will therefore provide either a permissive (make) or a blocking (break) signal to the tripping circuit of each circuit breaker phase, in case of independent phase operation, or common signal in case of three-phase operation circuit breakers.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1A:
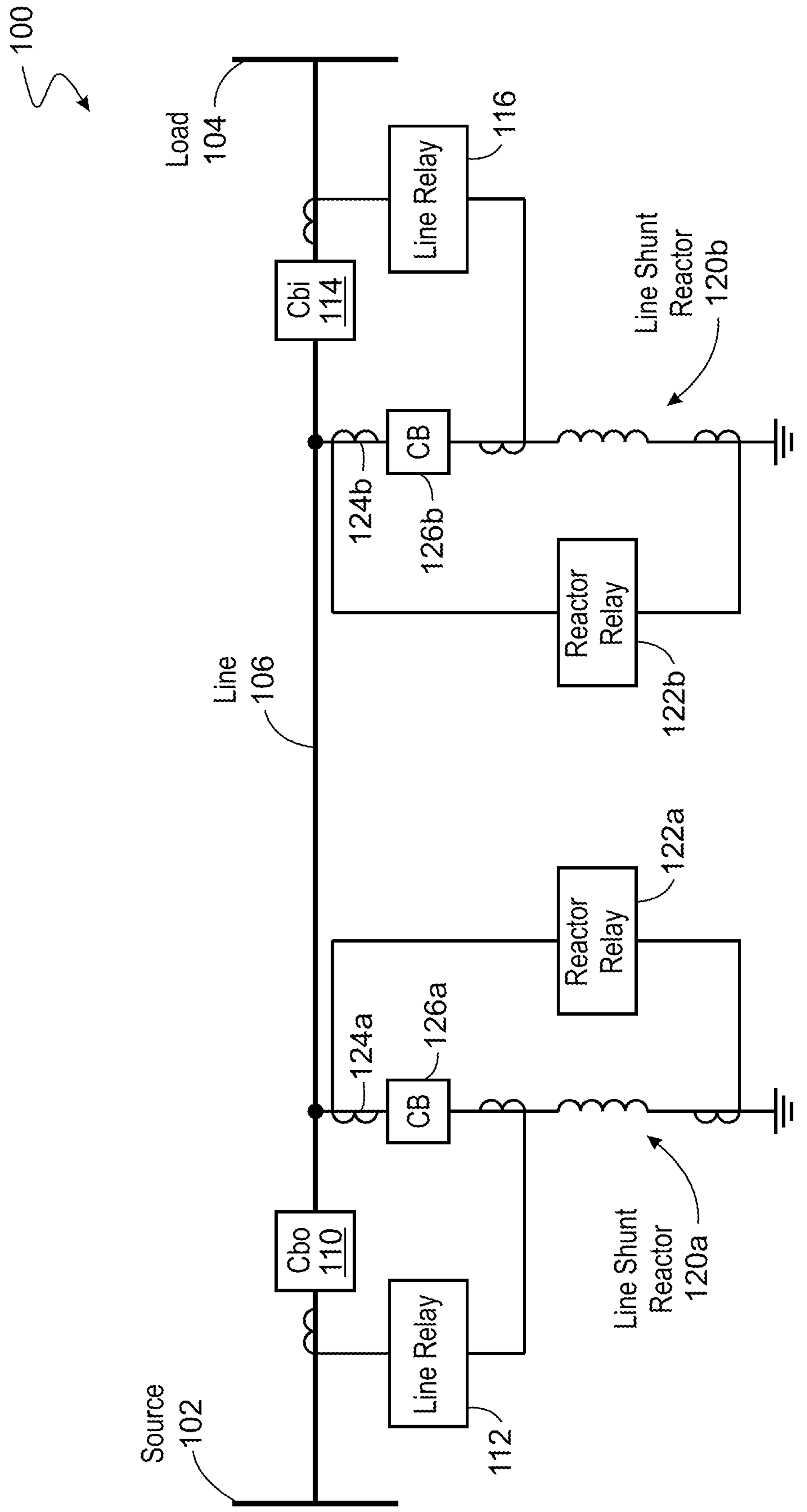
FIGS. 1A-1B are schematic diagrams of an example high-voltage power distribution stations in accordance with embodiments of the present disclosure.
Figure 1B:
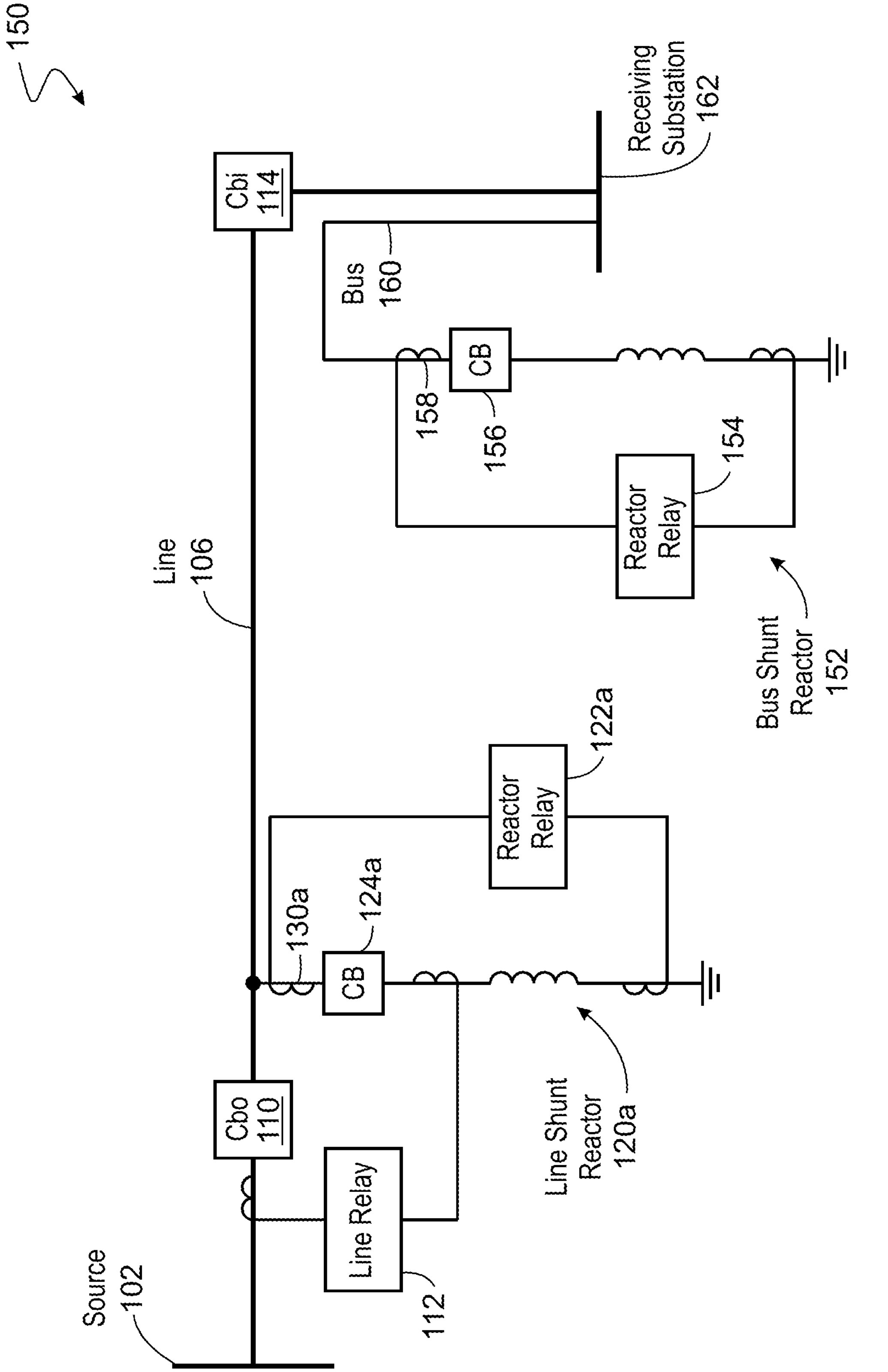

FIGS. 1A-1B are schematic diagrams of an example high-voltage power distribution stations in accordance with embodiments of the present disclosure. FIG. 1A illustrates a subset of components supporting a first example power distribution station 100. Power distribution station 100 includes a source 102 that is a source of high-voltage power being delivered across a power line 106 to a destination (here, referred to as load 104). Line 106 can include an outgoing line circuit breaker (CBo) 110. Outgoing line circuit breaker 110 can a type of circuit breaker that is implementation specific. The outgoing line circuit breaker 110, similar to other circuit breakers described herein, can interrupt the flow of electricity through line 106, for example, during a fault condition. An outgoing line relay 112 can be coupled to the line 104 upstream of the outgoing circuit breaker 110. Similarly, the line 106 can include an incoming circuit breaker (CBi) 114. An incoming line relay 116 can be coupled to the line downstream of the incoming circuit breaker 114.

A line shunt reactor 120*a* can be coupled to the line downstream of the outgoing circuit breaker. The line shunt reactor 120*a*, like other line shunt reactors described herein, can control the voltage on the line 106 during load variations. For example, shunt reactors can be used to increase the power on the line 106, and can absorb and compensate for reactive power in the line 106, thereby increasing overall efficiency. A reactor relay 122*a* can be coupled across the line shunt reactor 120*a* by a current transformer (CT) (or other coil) 124*a*. Downstream of the CT 124*a* and upstream of the line shunt reactor 120*a* is a reactor circuit breaker 126*a*.

Multiple line shunt reactors can be placed along the line 106, including second line shunt reactor 120*b*. Second line shunt reactor 120*b* can be coupled to line 106 upstream of incoming circuit breaker 114. A reactor relay 122*b* can be coupled across the second line shunt reactor 120*b* by a current transformer CT 124*b*. A reactor circuit breaker 126*b* can be downstream of the current transformer CT 124*b*.

In FIG. 1A, CT 124*a* corresponds to a protection zone that is shared by the outgoing circuit breaker 110 and the shunt reactor circuit breaker 126*a*. Therefore, if a fault event is triggered by CT 124*a*, then both outgoing circuit breaker 110 and reactor circuit breaker 126*a* will open. Outgoing circuit breaker 110*a* will open without any potential issues or damages to the breaker. But reactor circuit breaker 124*a* can open on high, asymmetrical current that is generated from the shunt reactor, which potentially can cause significant damage to the reactor circuit breaker 124*a*.

FIG. 1B illustrates a subset of components supporting a second example power distribution station 150. In the second example power distribution station 150, the (bus) shunt reactor 152 at the load end 104 is connected to the bus 160 that couples to a receiving substation 162. A reactor relay 154 is coupled across the bus shunt reactor 152 by a current transformer CT 158. A shunt reactor circuit breaker 156 resides downstream of the current transformer CT 158.

In FIG. 1B, when a fault occurs on the line 106, both incoming circuit breaker 114 and the shunt reactor breaker 156 will trip based on the line protection action. If a delayed zero-crossing scenario is occurring, however, tripping the breakers will potentially cause a significant damage on the incomer circuit breaker 114 from the high DC current from the bus shunt reactor 152.

Also, in FIG. 1B, if the line shunt reactor 120*a* is out of service, the risks associated with using the bus shunt reactor 152 are high. Therefore, system redundancy can't be achieved.

This disclosure describes devices and techniques to mitigate circuit breaker damage resulting from interrupting alternating current delayed zero-crossing. Embodiments of this disclosure are directed to a protection scheme and system redundancy that can be achieved without the need of using complex logic and block schemes. Aspects of the embodiments can also increase circuit breaker security in fault isolation. The devices and techniques described herein allow designers to avoid dependability on system modelling and protection scheme design.

Figure 2A:
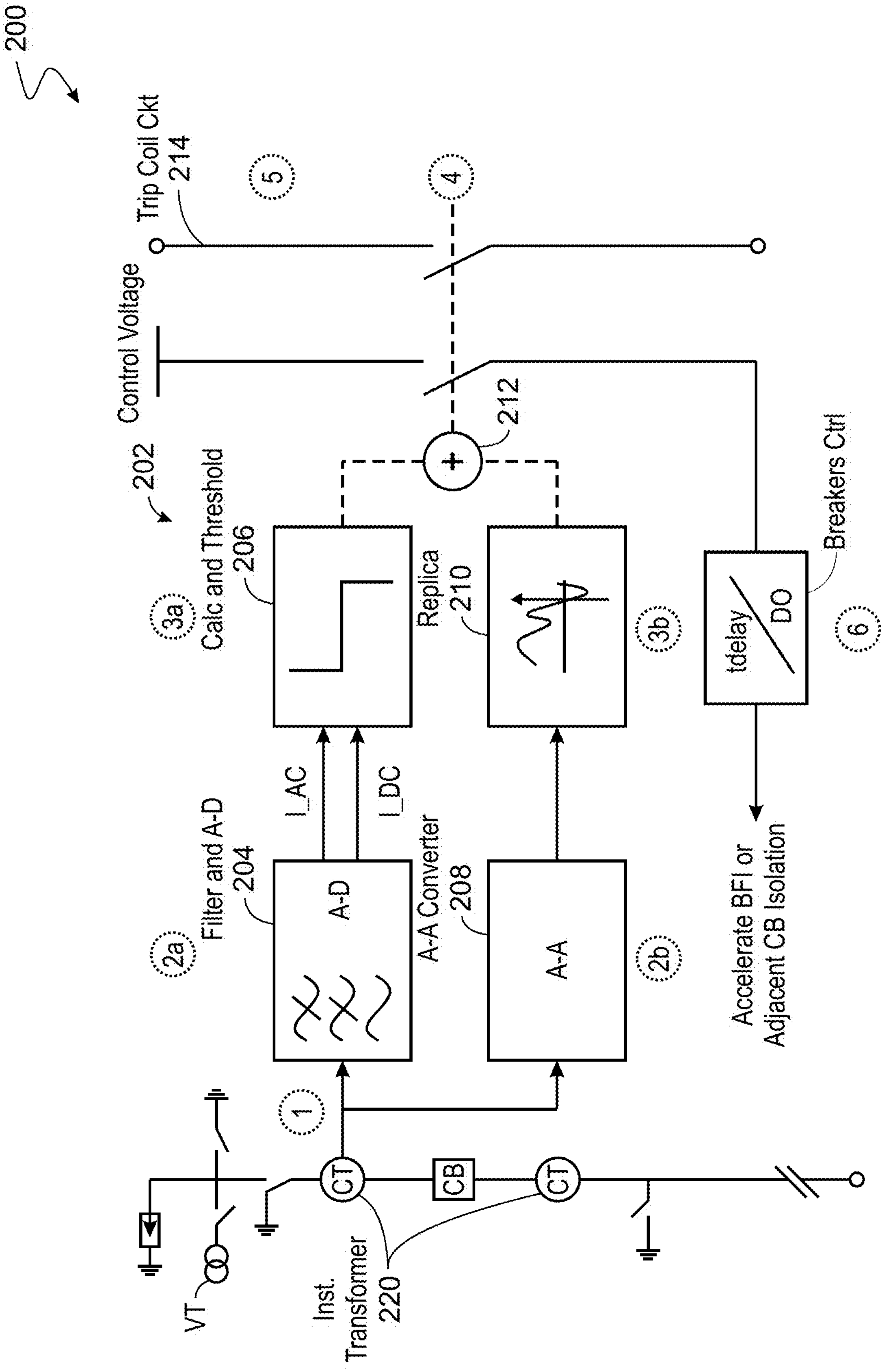
FIG. 2A is a schematic diagram of an example circuit for compensating for a delayed zero-crossing for tripping a circuit breaker in accordance with embodiments of the present disclosure.

FIG. 2A is a schematic diagram 200 of an example signal processing circuitry 202 for compensating for a delayed zero-crossing for tripping a circuit breaker in accordance with embodiments of the present disclosure. FIG. 2A illustrates a signal processing circuitry 202 to be located in the circuit breaker local control cabinet (such as that shown in FIG. 3) and that utilizes a digital signal processing and also includes analog replica calculation methodology, to detect a current delayed zero-crossing occurrence. The signal processing circuitry 202 will therefore provide either a permissive or a blocking signal to the tripping circuit 214 of each circuit breaker phase (in the case of independent phase operation) or common signal (in the case of three-phase operation circuit breakers). The permissive signal can cause the circuit breaker to trip; the blocking signal can cause the circuit breaker to hold off from tripping to prevent damaging the circuit breaker during a delayed zero-crossing occurrence.

The signal processing circuitry 202 can be coupled on an input side to an instrument transformer 220 from a power circuit breaker CB 212, at (1). Instrument transformers 220 with high-resolution for DC component current measurement are installed within breaker bushing (dead-tank case) or nearby CT chambers (GIS-case).

The signal processing circuitry 202 detects the current delayed zero-crossing occurrence using one or both of digital and analog signal analysis. Signal processing circuitry 202 includes a digital signal processing path shows as (2*a*) and (3*a*) in FIG. 2A. At (1), digital signal processing path receives as an input the analog AC signal from an instrument current transformer (CT) 220. At (2*a*), the digital signal processing path includes an filter and analog-to-digital converter (A-D converter) 204. The filter can perform a high frequency filtering to retain the fundamental frequency of the AC signal, and can isolate the AC (I_AC) and DC (I_DC) components. The A-D converter can convert the received analog AC input into a digital signal.

At (3*a*), the digital signal processing path can also include calculation block functions and threshold library 206. At (3*a*), the digital signal processing path also includes a threshold establishment circuit that determines an adaptive threshold band based on an instantaneous current magnitude decay rate as compared with the DC component magnitude from the calculation block functions.

Calculation block functions includes digital signal processing block functions that can compare the rate of change of AC current compared with DC current. These calculations are described in more detail below. (An example process for these calculations is described in more detail in the text accompanying FIG. 6.) The threshold library can include a data store for storing threshold value information obtained from prior observations. The average rate of change of AC current are compared against these thresholds by the block functions. The zero-crossing is estimated based on comparisons by the block functions of the average rate of change of AC current against threshold values. A permissive signal or a blocking signal is generated and output to a CB (such as a reactor CB) based on the zero-crossing estimation by the digital signal processing path.

In addition to the digital signal processing path, the signal processing circuitry 202 also includes an analog signal processing path, shown as (2*b*) and (3*b*) in FIG. 2A. The analog signal processing path includes, at (2*b*), an analog-to-analog (A-A) signal processing and, at (3*b*), a replica circuit 210.

At (2*b*), the A-A filter 208 can receive the analog AC signal (from (1)) as an input. The A-A filter 208 can scale and smooth the analog AC signal into a differently formatted analog AC signal. For example, the A-A filter 208 can simplify, dampen, or otherwise convert the received analog AC signal into a format that is compatible for use with the replica circuitry 210.

The analog AC output from the A-A filter 208 is input into zero-crossing replica circuitry 210. The zero-crossing replica analog signal processing circuitry 210 includes passive and active analog elements with one or a combination of capacitors, resistors, operational amplifiers, diodes, and/or other passive circuit elements. The zero-crossing analog replica circuitry 210 can replicate the equivalent power line and/or other power system impedances. The A-A filtered analog AC signal traverses the zero-crossing analog replica circuitry 210. The output of the zero-crossing analog replica circuitry 210 is an approximation of the zero-crossing of the A-A converted analog AC signal, which represents the zero-crossing of the original AC signal from the instrument transformer 220. The use of a zero-crossing replica circuitry 210 allows for an alternate (and redundant) calculation and estimation of the zero-crossing, if needed, based on an analog circuit. In general, the zero-crossing replica circuitry 210 includes analog circuit elements, which can include a combination of passive components, such as resistors and capacitors, that can detect the zero crossing of the analog signal. Through replica methodology, the signal processing circuitry 202 provides either a permissive or a blocking signal to the tripping circuit of each circuit breaker phase, in case of independent phase operation, or common signal in case of three-phase operation circuit breakers.

In some embodiments, the output from the digital signal processing path (2*a*)-(3*a*) and the output from the analog signal processing path (2*b*)-(3*b*) can be compared by a comparison block 212. In this way, the analog signal processing path can act as a redundancy for the digital signal processing path (and vice versa). The comparison block 212 can include hardware or software that can ensure that the correct permissive or blocking signaling is sent to the trip coil circuit 214. Since part of the purpose of the signaling processing circuitry 202 to prevent early tripping of the CB during a delayed zero-crossing event, a default output from the comparison block 212 can be a blocking signal. That is, if there is a conflict between the output of the digital signal processing path and the output of the analog signal processing path, the comparison block 212 can output a blocking signal until the conflict is resolved. A conflict can be that the digital signal processing path and the analog signal processing path output different signaling. If both output the same signaling, then the comparison block 212 can pass through that signaling (e.g., permissive or blocking signaling).

At (4), the output contacts receive the signal for operation. These contacts can be normally closed, or normally opening to offer user flexibility for implementation as a blocking scheme or tripping scheme. The signal is designed to be an output dry contact, operated by the signal processing circuitry 202, that will be wired in series with the existing trip circuit of the breaker. Transmitted: the dry contact will close providing continuity to the control voltage to energize the breaker trip coil. This is considered a permissive signal and the default status of the signal processing circuitry 202 output contact. While the blocking signal is the same output contact that will be opened by the signal processing circuitry 202 to interrupt the continuity to the trip coil.

Figure 2B:
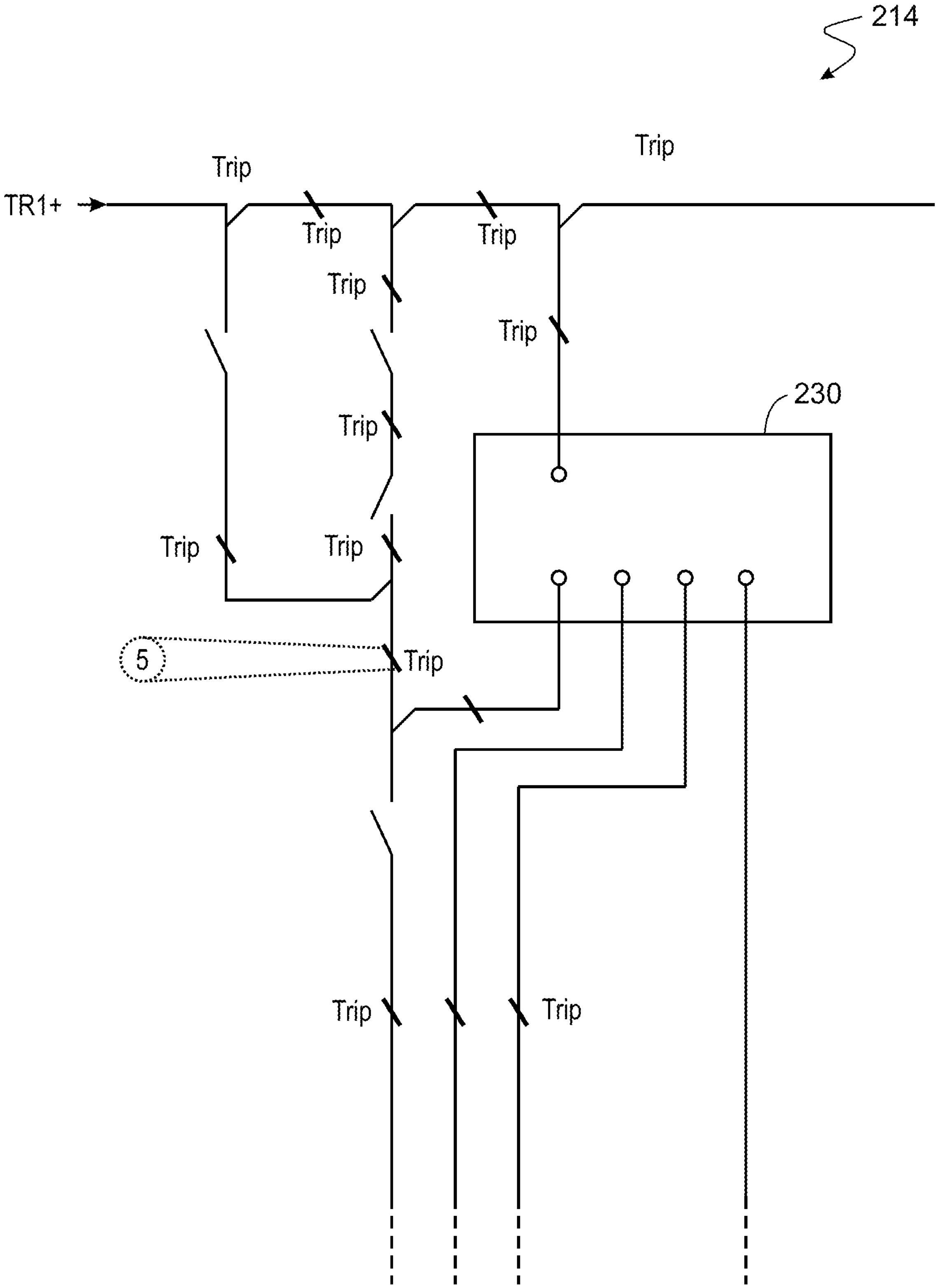
FIG. 2B is a schematic diagram of an example trip coil circuit showing a location of the example circuit of FIG. 2A in accordance with embodiments of the present disclosure.
Figure 3:
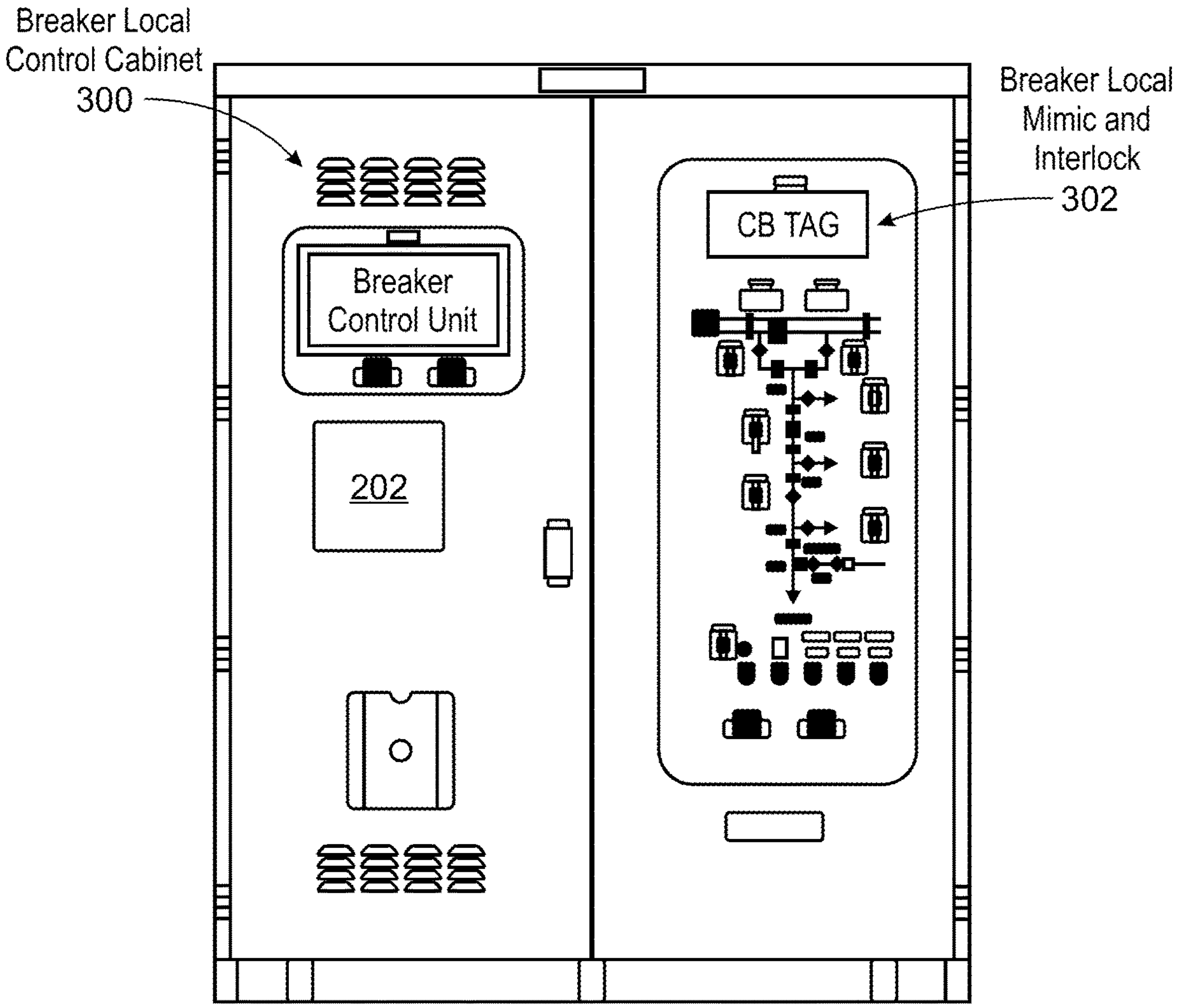
FIG. 3 is a schematic diagram of an example circuit breaker local cabinet for housing the example circuit of FIG. 2A in accordance with embodiments of the present disclosure.

At (5), the location of output contacts are preferably in series with the permissive contacts related to mechanical availability of the subject breaker (e.g., gas pressure, etc.). At (5), the output dry contact that is available in the signal processing circuitry 202 and is wired in series with the breaker tripping control circuit 214. If the signal processing circuitry 202 detects risk of opening the breaker during current delayed zero-crossing, then the output contact changes to open status interrupting the tripping circuit to the breaker trip coil, and thus preventing the operation. Otherwise, the output contact remains in its normally closed position, and therefore, breaker can instantaneously operate if required. FIG. 2B is a schematic diagram of an example trip coil circuit 214 showing a location of the example circuit of FIG. 2A in accordance with embodiments of the present disclosure. FIG. 2B shows an example trip coil circuit 214 and a relay 230. At (5), the signal processing circuitry 202 can be connected to provide the permissive or blocking signal. FIG. 3 is a schematic diagram of an example circuit breaker local cabinet 300 for housing the example circuit of FIG. 2A in accordance with embodiments of the present disclosure. The circuit breaker local control cabinet 300 can be part of a high-voltage power station or substation, including those kept on off-shore installations. The circuit breaker local control cabinet 300 can include the signal processing circuitry 202, which can be wired in series with the trip circuit breaker 214. The circuit breaker local control cabinet 300 can also include other components, such as the breaker local mimic and interlock 302.

The signal processing circuitry 202 will be dedicated to this functionality of zero-crossing current detection and it will be installed at the respective circuit breaker local control cabinet, providing simplicity for both output contacts wiring, and protection engineers design on their relying scheme to protect against delayed-zero crossing. FIG. 3 shows a typical GIS circuit breaker local control cabinet.

This signal processing circuitry 202 is installed in each circuit breaker control cabinet (shown in FIG. 3) that will remove the added complexity of a protection scheme and control logic to account for current delayed zero-crossing. The signal processing circuitry 202 can be installed next to the breaker control unit. Other types of circuit breakers can also integrate the circuitry 202 described herein.

At (6), an optional feature allows the user to accelerate the tripping of adjacent breakers in case of fault currents that requires fast isolation scheme. At (6), an additional feature allows adjacent breakers to trip in case the subject breaker is blocked to be used at the discretion of each user. Similarly, additional output contacts are provided for flexibility of different scheme implementation depending on system complexity of user requirements.

Figure 6:
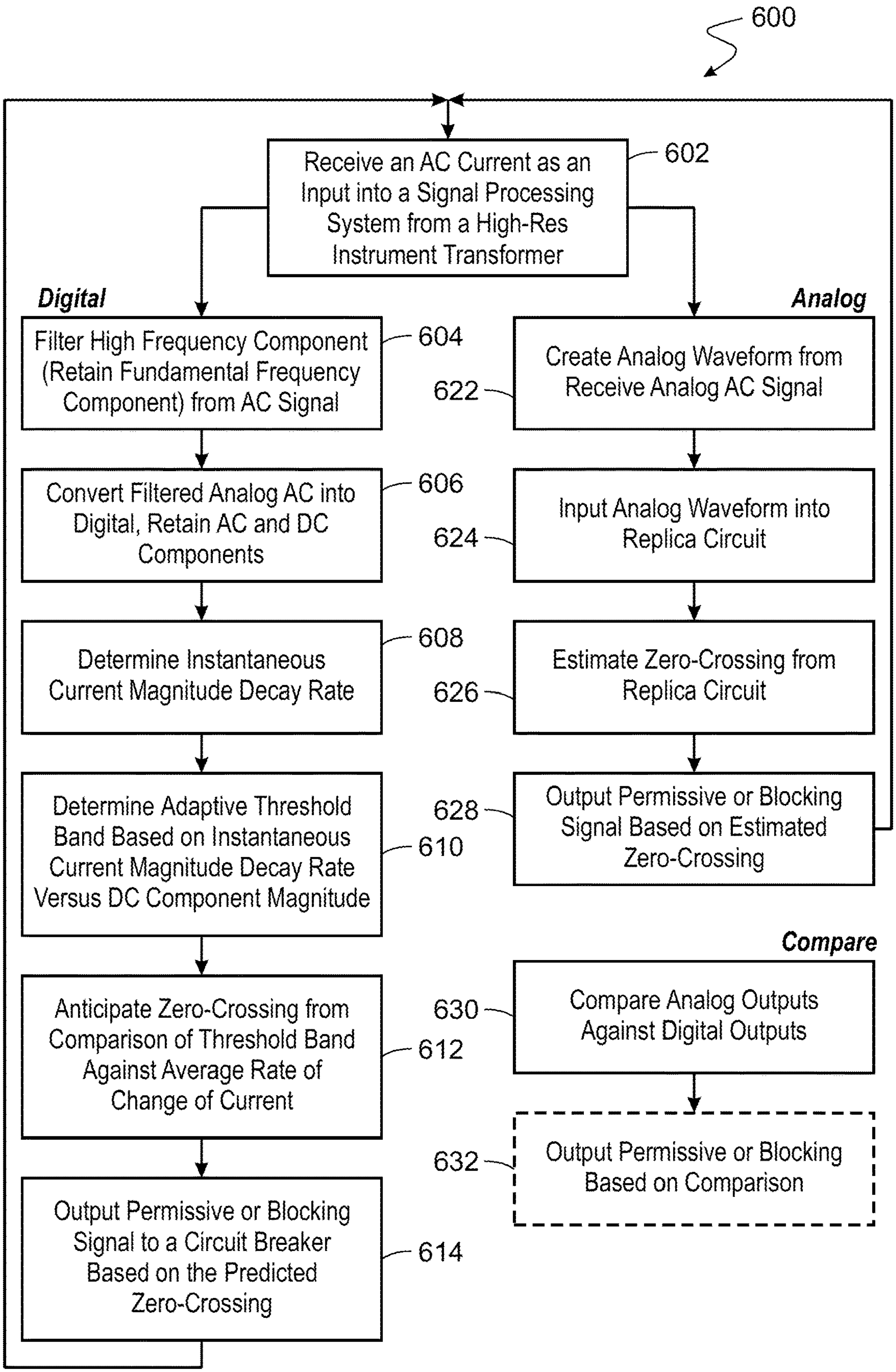
FIG. 6 is a process flow diagram for controlling a circuit breaker in accordance with embodiments of the present disclosure.

FIG. 6 is a process flow diagram 600 for controlling a circuit breaker in accordance with embodiments of the present disclosure. FIG. 6 shows the digital signal processing path and the analog signal processing path occurring in parallel. One or both processing paths can be used to create the permissive or blocking signals.

The process embedded in the signal processing circuitry 202 is based on the instantaneous calculation of the rate of change on the industrial frequency AC component as compared with the DC component. Accordingly, the signal processing circuitry 202 will anticipate and expedite a permissive signal if conditions are satisfied or, instead, will initiate a blocking signal to safeguard circuit breaker integrity from opening during delayed zero-crossing.

At the outset, the signal processing circuitry 202 can receive an AC signal. (602). In the digital signal processing flow path, the AC signal can be filtered of high-frequencies, such as noise, to obtain and retain the fundamental frequency of the AC signal (604). The filtered analog AC signal can be converted into a digital signal; and the AC (I_AC) and DC (I_DC) components can be isolated. (606).

Figure 4:
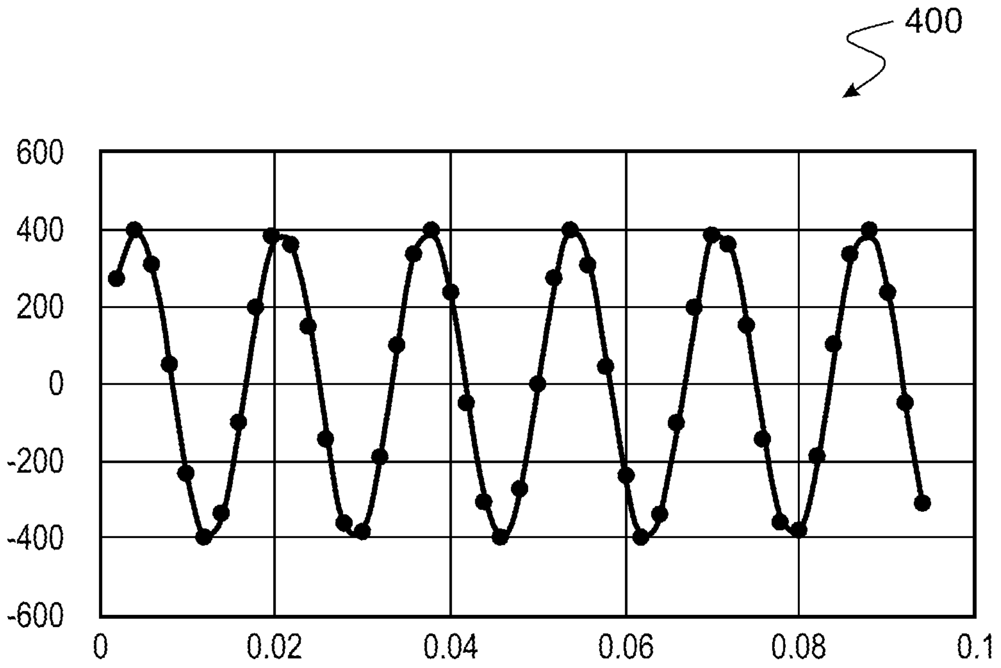
FIG. 4 is a graphical representation of simulated down-sampled AC component instantaneous values used for calculating current values for anticipating zero-crossing in accordance with embodiments of the present disclosure.
Figure 5:
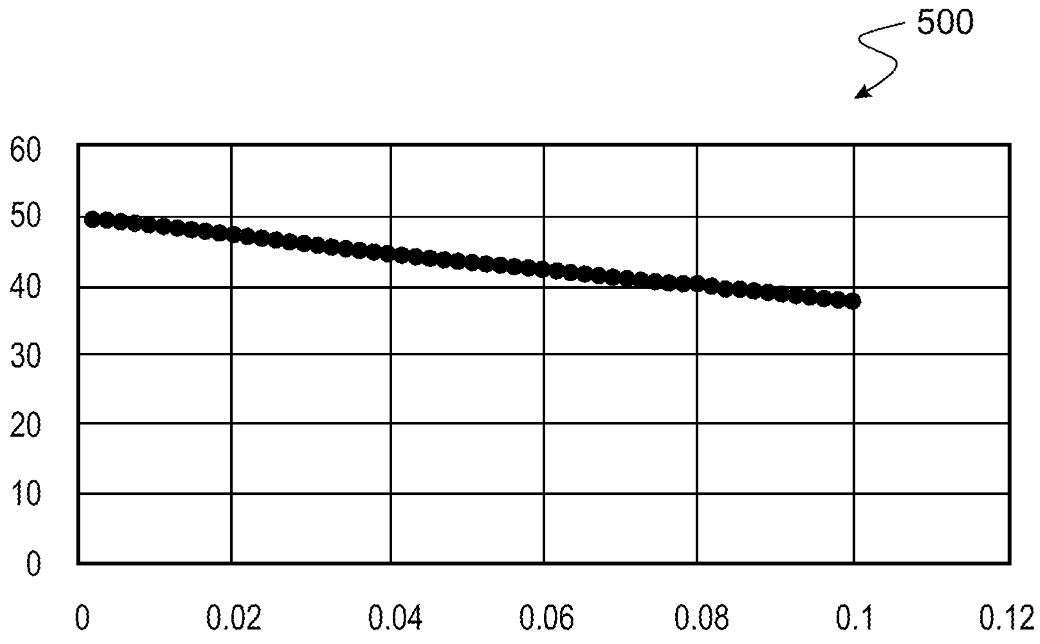
FIG. 5 is a graphical representation of simulated down-sampled DC component instantaneous values used for calculating current values for anticipating zero-crossing in accordance with embodiments of the present disclosure.

Continuing the digital signal processing path, the signal processing circuitry 202 can then determine the instantaneous current magnitude decay rate. (608). The process can include first down-sampling the AC and DC signal to eight (8) samples per cycle. Examples of down sampling are shown in FIGS. 4 and 5. FIG. 4 is a graphical representation 400 of simulated down-sampled AC component instantaneous values used for calculating current values for anticipating zero-crossing in accordance with embodiments of the present disclosure. FIG. 5 is a graphical representation 500 of simulated down-sampled DC component instantaneous values used for calculating current values for anticipating zero-crossing in accordance with embodiments of the present disclosure.

Then two (2) consecutive instantaneous current magnitudes are used as a moving window to calculate the rate of change of ac current as compared with the DC component magnitude.

The following equations provide illustrative and non-limiting examples that can be used as a general basis for deriving the pertinent current values:

$$Ichange_{average} = \frac{1}{4}\sum_{t=0}^{3} \Delta Iac_{t+1} \tag{1}$$

$$\Delta Ichange_{t+1} = \frac{Iac_{t+1} - Iac_t}{Idc} \tag{2}$$

where:

$Iac_t$ the instantaneous current sample value at time t;

$Ichange_{average}$ the average of the four calculated rate of change of AC current compared with DC; and ΔIchange(t) is the rate of change of two (2) sampled ac current compared with the sampled DC value.

FIGS. 4 and 5 show a simulated down-sampled ac and dc component for the application of Eqs. (1) and (2).

An adaptive threshold value K can be determined. (610). For example, the adaptive threshold value K can be ascertained from look-up tables or libraries that contain threshold values K for various conditions, described in more detail below. The value of K is adaptively calculated in every sample values based on the magnitude of current. The value determine provides security on anticipating a delayed zero-crossing based on predetermined system parameters. If the average of the rate of change, in a semi-cycle of industrial frequency waveform, is above the threshold established in comparison to the DC component magnitude, then the signal processing circuitry 202 can adaptively anticipate a zero-crossing in subsequent semi-cycles and expedite the permissive signal for tripping or opening the associated circuit breaker, as expressed in Eq. (3). (612). The signal in this stage can be down-sampled to an 8 samples per cycle, meaning that every semi-cycle has four (4) instantaneous records to calculate the average for the rate-of-change.

$$\text{Permissive condition}\begin{cases} Ichange_{average} > K \cdot Idc \\ \Delta Iac_{t+1} > K \cdot Idc \end{cases}, \tag{3}$$

where K is the adaptive threshold value, dimensionless, for condition (a) is ranging 0.4-0.6, while condition (b) is 1.5.

The conditions for a permissive signal that will result in a successful breaker opening, with no risk of failure due to delayed zero-crossing current, are given in equation (3) by two (2) conditions: (a) the average of four (4) consecutive samples are greater than the established threshold for the subject current magnitudes, or (b) the AC component rate of change as compared with the DC component is greater than the threshold K. These threshold are determined through system simulation of the operating power system. These simulation results identified for condition (a) an average value greater than (0.4-0.6)×I(dc) for permissive signal, while for condition (b), the result should be greater than 1.5×I(dc) for a permissive signal.

The signal processing circuitry 202 can then output the permissive or blocking signal to the circuit breaker. (614). The permissive signal can cause the circuit breaker to trip to sever the electrical connection; while the blocking signal can delay the circuit breaker from tripping until a point in time that the permissive signal is transmitted. In that way, the above mentioned calculations can be performed until the permissive signal is determined and sent to the circuit breaker.

Turning to the analog signal processing path, the signal processing circuitry 202 can receive as an input the AC signal from (602) into an analog-to-analog (A-A) converter. The A-A converter can create an analog AC signal representative of the original AC signal for the analog zero-crossing replica circuit. (622). The analog AC signal can be input into the analog zero-crossing replica circuit. (624). The analog zero-crossing replica circuit can include passive circuit elements that replicates the capacitance of the line. The analog zero-crossing replica circuit can output an estimate of the zero-crossing based on the inputted analog AC signal. (626). The zero-crossing determination can be used by the signal processing circuitry 202 to output a permissive or blocking signal to the CB. (628).

In embodiments, the output from the digital signal processing path and the output from the analog signal processing path can be compared by a comparator or other comparison functional block. (630). The comparator can then output a permissive or blocking signal based on the comparison. (632). The comparator can operate to pass through a permissive signal if both the digital and analog outputs are permissive. The comparator can operator to send a blocking signal if one or both of the digital and analog outputs are blocking. This way, the default output is blocking if a conflict is detected by the comparison of the digital and analog outputs.

Figure 7:
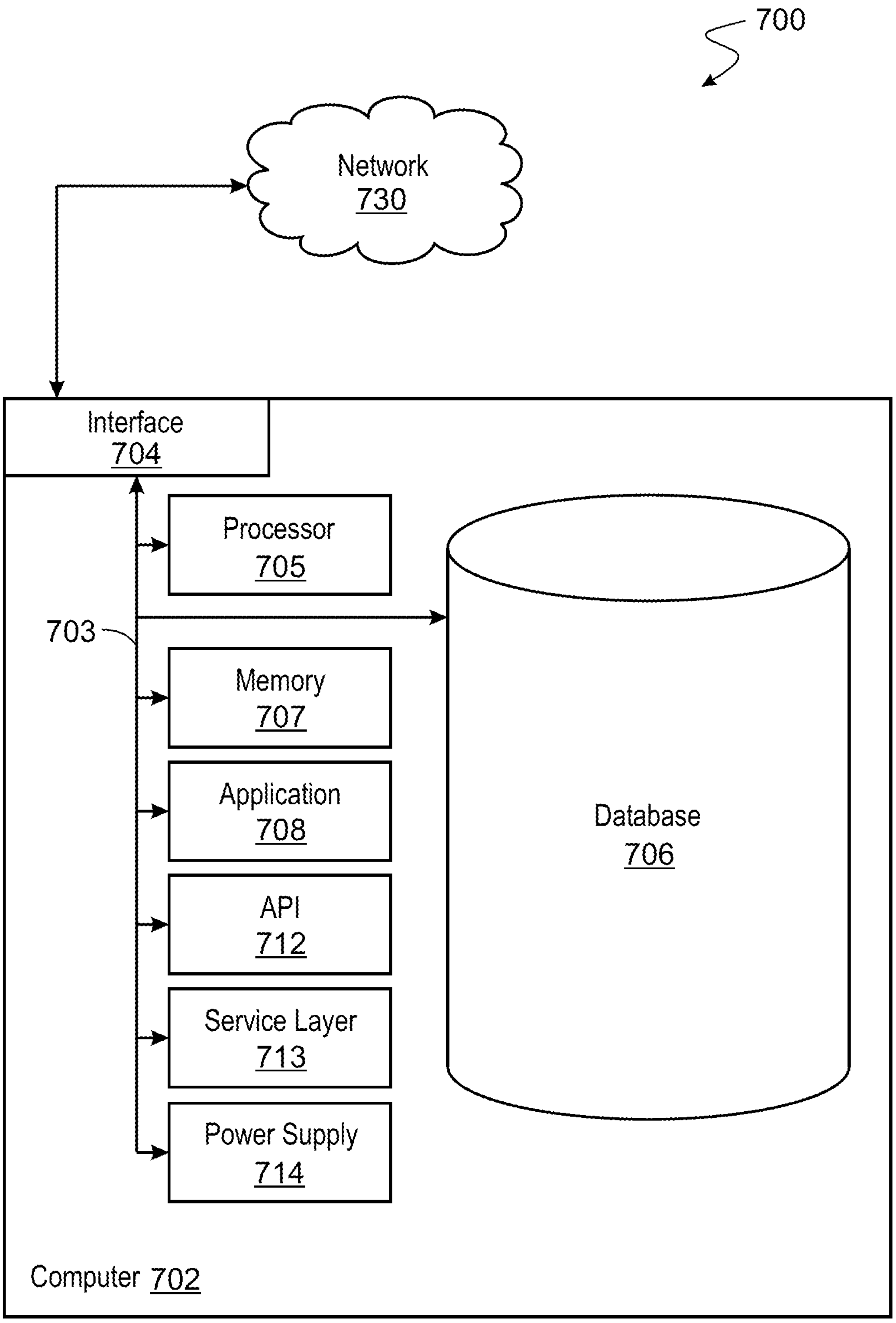
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or nonrechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method comprising:

receiving, by a signal processing circuit, a continuous alternating current (AC) electrical signal;

determining, by the signal processing circuit, an anticipated zero-crossing from the continuous AC electrical signal based on a comparison of an average of an instantaneous value of the AC electrical signal with a corresponding value of a direct current (DC) component of the AC electrical signal; and sending, to a circuit breaker, a permissive signal to operate the circuit breaker or a blocking signal to prevent operation of the circuit breaker based on the determination of the anticipated zero-crossing.

2. The method of claim 1, wherein determining the anticipated zero-crossing comprises:

determining, by the signal processing circuit, a rate of change of the AC electrical signal; and comparing the rate of change of the AC electrical signal against a threshold value.

3. The method of claim 2, wherein:

the permissive signal is generated based on the rate of change of the AC electrical signal being greater than the threshold value; and the blocking signal is generated based on the rate of change of the AC electrical signal being less than or equal to the threshold value.

4. The method of claim 3, wherein the threshold value comprises a value of 1.5 times the DC component of the AC electrical signal.

5. The method of claim 1, wherein determining the anticipated zero-crossing comprises:

calculating an average of four consecutive samples of the continuous AC electrical signals over time; and comparing the average of four consecutive samples of the continuous AC electrical signals against a threshold value.

6. The method of claim 5, wherein:

the permissive signal is generated based on the average of four consecutive samples of the continuous AC electrical signals being greater than the threshold value; and the blocking signal is generated based on the rate of change of the AC electrical signal being less than or equal to the threshold value.

7. The method of claim 6, wherein the threshold value comprises a value in the range of 0.4 to 0.6 times the DC component of the AC electrical signal.

8. The method of claim 1, further comprising down-sampling the AC electrical signal and the DC component to eight samples per cycle.

9. The method of claim 1, further comprising filtering high frequency from the AC electrical signal.

10. An apparatus comprising:

a signal processing circuitry electrically coupled in series to a trip circuit breaker within a circuit breaker local control cabinet, the signal processing circuitry configured to:

receive a continuous alternating current (AC) electrical signal;

determine an anticipated zero-crossing from the continuous AC electrical signal based on a comparison of an average of an instantaneous value of the AC electrical signal with a corresponding value of a direct current (DC) component of the AC electrical signal; and send, to the circuit breaker, a permissive signal to operate the circuit breaker or a blocking signal to prevent operation of the circuit breaker based on the determination of the anticipated zero-crossing.

11. The apparatus of claim 10, wherein the signal processing circuitry is to determine the anticipated zero-crossing by:

determining, by the signal processing circuit, a rate of change of the AC electrical signal; and comparing the rate of change of the AC electrical signal against a threshold value.

12. The apparatus of claim 11, wherein:

the permissive signal is generated based on the rate of change of the AC electrical signal being greater than the threshold value; and the blocking signal is generated based on the rate of change of the AC electrical signal being less than or equal to the threshold value.

13. The apparatus of claim 12, wherein the threshold value comprises a value of 1.5 times the DC component of the AC electrical signal.

14. The apparatus of claim 10, wherein signal processing circuitry is to determine the anticipated zero-crossing by:

calculating an average of four consecutive samples of the continuous AC electrical signals over time; and comparing the average of four consecutive samples of the continuous AC electrical signals against a threshold value.

15. The apparatus of claim 14, wherein:

the permissive signal is generated based on the average of four consecutive samples of the continuous AC electrical signals being greater than the threshold value; and the blocking signal is generated based on the rate of change of the AC electrical signal being less than or equal to the threshold value.

16. The apparatus of claim 15, wherein the threshold value comprises a value in the range of 0.4 to 0.6 times the DC component of the AC electrical signal.

17. The apparatus of claim 10, further comprising down-sampling the AC electrical signal and the DC component to eight samples per cycle.

18. The apparatus of claim 10, further comprising filtering high frequency from the AC electrical signal.

19. A system comprising:

a circuit breaker in a high voltage power station;

a circuit breaker local control cabinet; and a signal processing circuit housed in the circuit breaker local control cabinet and wired in series with the circuit breaker, the signal processing circuit configured to:

receive a continuous alternating current (AC) electrical signal;

determine an anticipated zero-crossing from the continuous AC electrical signal based on a comparison of an average of an instantaneous value of the AC electrical signal with a corresponding value of a direct current (DC) component of the AC electrical signal; and send, to the circuit breaker, a permissive signal to operate the circuit breaker or a blocking signal to prevent operation of the circuit breaker based on the determination of the anticipated zero-crossing.

20. The system of claim 19, wherein the signal processing circuitry is to determine the anticipated zero-crossing by:

determining, by the signal processing circuit, a rate of change of the AC electrical signal; and comparing the rate of change of the AC electrical signal against a threshold value;

wherein:

the permissive signal is generated based on the rate of change of the AC electrical signal being greater than the threshold value; and the blocking signal is generated based on the rate of change of the AC electrical signal being less than or equal to the threshold value.

21. The system of claim 19, wherein the signal processing circuitry is to determine the anticipated zero-crossing by:

calculating an average of four consecutive samples of the continuous AC electrical signals over time; and comparing the average of four consecutive samples of the continuous AC electrical signals against a threshold value;

wherein:

the permissive signal is generated based on the average of four consecutive samples of the continuous AC electrical signals being greater than the threshold value; and the blocking signal is generated based on the rate of change of the AC electrical signal being less than or equal to the threshold value.

* * * * *